J. SHEEHAN 3,543,483

SEPARATOR APPARATUS

Filed July 6, 1967 3 Sheets-Sheet 1

INVENTOR.
JOHN JAMES SHEEHAN
BY
Teare, Teare & Sammon
ATTORNEYS

Dec. 1, 1970   J. J. SHEEHAN   3,543,483
SEPARATOR APPARATUS

Filed July 6, 1967   3 Sheets-Sheet 2

INVENTOR.
JOHN JAMES SHEEHAN
BY
Teare, Teare & Sammon
ATTORNEYS

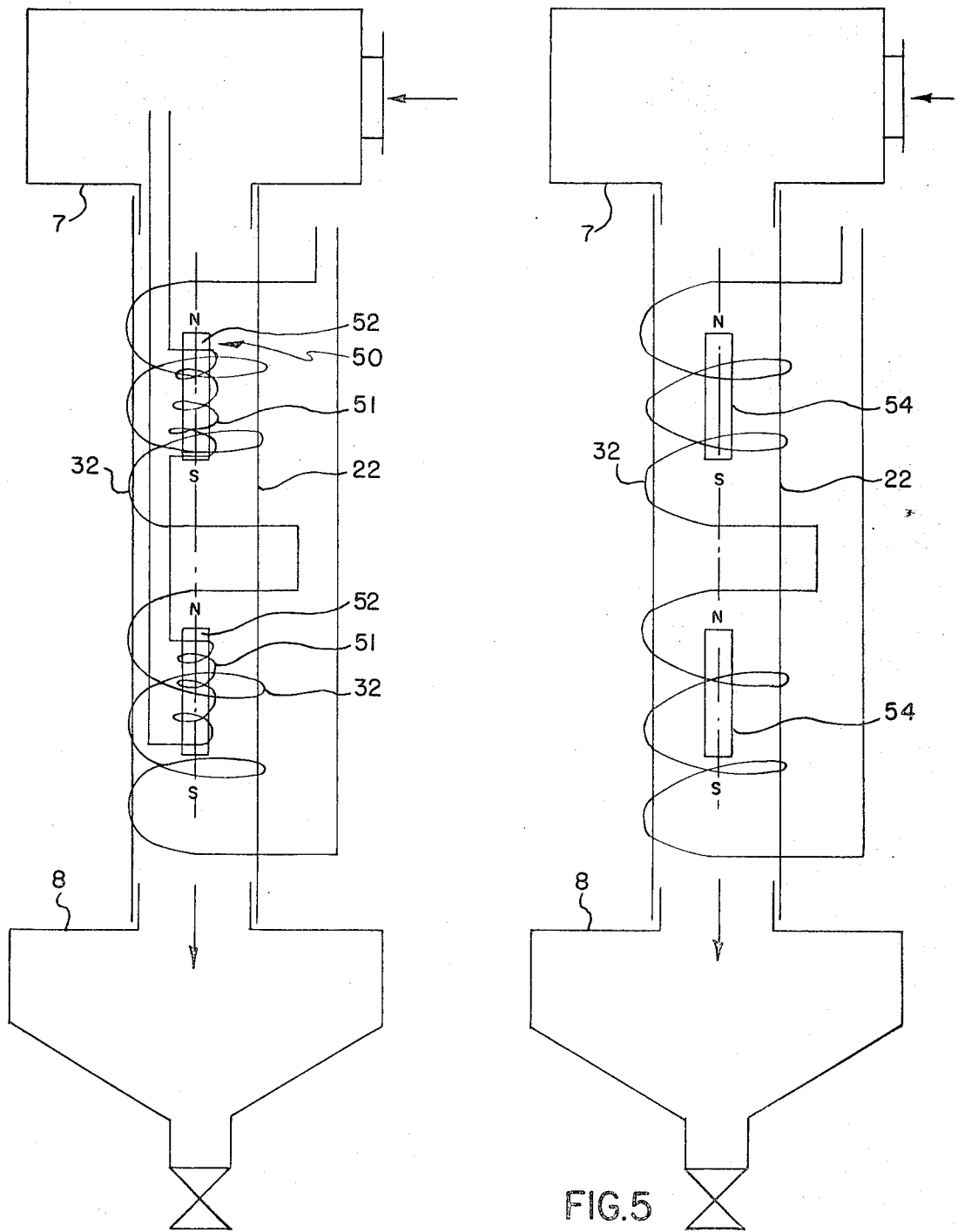

United States Patent Office 3,543,483
Patented Dec. 1, 1970

3,543,483
SEPARATOR APPARATUS
John James Sheehan, Berea, Ohio, assignor to Buell Engineering Company, Inc., Lebanon, Pa., a corporation of Delaware
Filed July 6, 1967, Ser. No. 651,441
Int. Cl. B01d 46/04
U.S. Cl. 55—272         14 Claims

ABSTRACT OF THE DISCLOSURE

A dust collecting apparatus for removing solid materials from a gaseous stream including a plurality of collector units with filter members disposed in dust separating and/or collecting communication within the collector units for removing entrained dust from the gaseous stream by deposit thereof on the filter members. Deflection elements are disposed in coacting association with the filter members and with magnetic elements disposed adjacent the filter members for periodically imparting shaking movement to the filter members for removing collected dust therefrom upon electrical energization of the deflection elements and/or the magnetic elements.

BACKGROUND OF THE INVENTION

The present invention relates to the removal of solid materials, such as dust or the like, from a gaseous stream, and particularly relates to those devices, such as dust collectors, which employ a filter media for separating and/or collecting the dust from a gaseous stream.

In a conventional filter for dust collecting units, the dust-laden gaseous medium is directed in contact with filter media, such as bags or the like. Generally, the gas is directed through the filter media by a pressure differential. As the gaseous medium passes through the filter media, the dust carried by the gaseous medium is entrapped between the interstices of the fabric of the filter media. In order to maintain the cleaning efficiency of the apparatus it is necessary to periodically remove the collected dust from the filter media.

In the past, the removal of such deposited dust has been achieved by various methods, such as by reverse-air flow, mechanical and/or electro-mechanical shaking, the use of sonic waves or any combination thereof. The reverse-air flow method has the disadvantage that it is necessary to periodically shut down or interrupt the operation during the reverse-air flow portion of the cycle. In the use of heretofore known mechanical or electro-mechanical shaking devices, it has been found that increased wear has been imparted to the filter media in addition to the difficulty that the shaking force was not delivered uniformly throughout the entire length of the filter media. This presented a particular difficulty where the media was in the form of an elongated filter bag. Furthermore, in prior shaking devices, filter wear was increased due to the severe or abrupt flexing action imparted by such devices. The more recent use of sonic vibratory devices has not been entirely satisfactory. Such devices have usually been employed as auxiliary equipment used in conjunction with the aforementioned methods and have not been entirely efficient for cleaning the filter media.

SUMMARY OF THE INVENTION

The present invention contemplates the provision of a novel separator device comprising a deflecting means associated in deflecting relationship with a filter member, and a magnetic means for selectively and uniformly deflecting the deflecting means which automatically imparts a deflective movement to the filter member so as to efficiently remove deposited dust or the like therefrom.

The mechanism of the invention provides a periodic cleansing of the filter member without interrupting the separation and/or collecting operation so as to increase the cleaning efficiency and the through-put rate of the dust collector. Such an arrangement provides a more uniform and less abrupt flexing or deflecting action of the filter members so as to reduce damage or actual breakage thereof after extended use. In addition, such arrangement may be made as an integral part of the filter member so as to eliminate wear and/or abrasion between the parts during the cleaning operation. The mechanism is of a simple, yet durable construction which is relatively inexpensive to produce and install.

BRIEF DESCRIPTION OF THE DRAWINGS

FIG. 4 is a diagrammatic representation of another modification of the separator device made in accordance with the present invention;

FIG. 5 is a diagrammatic representation of a further modification of the separator device made in accordance with the present invention.

DESCRIPTION OF THE PREFERRED EMBODIMENTS

Figure 1:
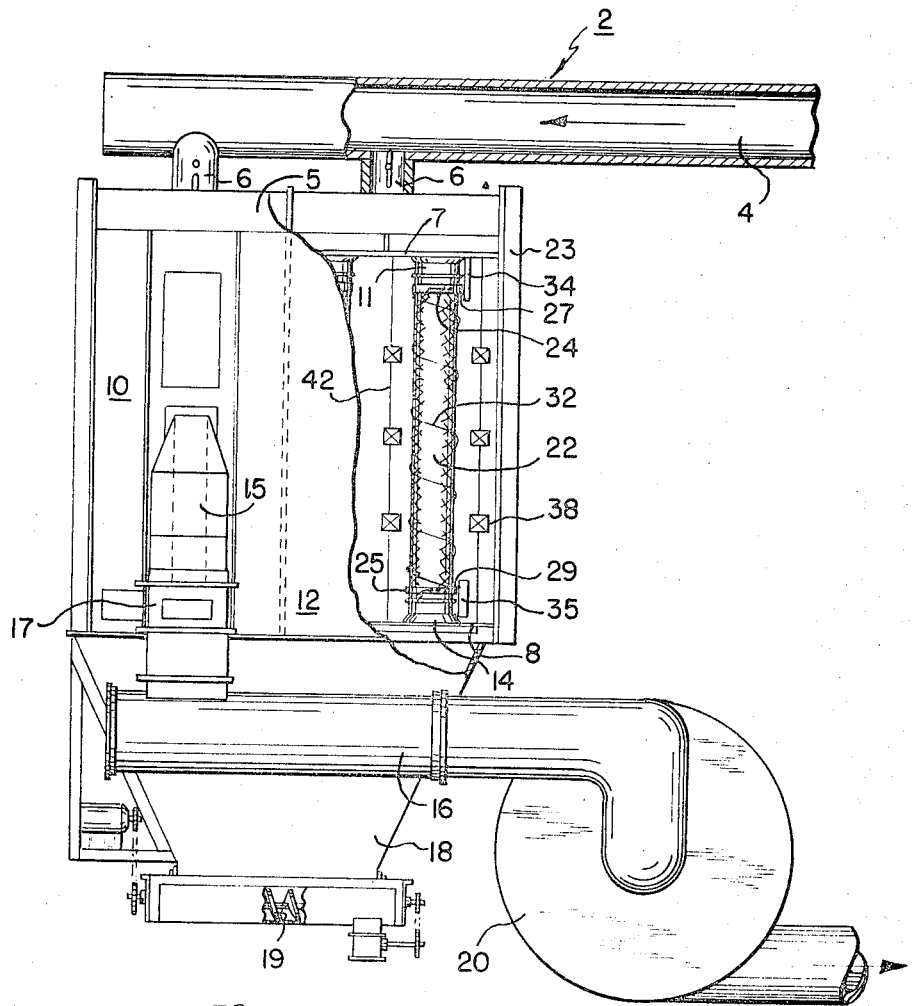
FIG. 1 is a partially broken, generally diagrammatic side elevation view of a dust collecting apparatus embodying the novel filter device of the present invention.

Referring again to the drawings, and in particular to FIG. 1 thereof, there is illustrated a dust collecting apparatus, designated generally at 2, which has a series of filtering units or compartments 10 and 12, each of which contains a plurality of vertically oriented filter bags 22. The compartments 10 and 12 may be mounted on a hopper 18, at the base of which a screw-type conveyor 19 may be provided for removing collected dust discharged from the interior surface of the bags.

As shown, a dust air inlet duct 4 may extend across the top of all of the compartments. The dust-laden air preferably passes via valve or baffle controlled ducts 6 and plenum 5 into each compartment. Downwardly from the side of each compartment there is provided an exhaust ductwork 15 through which the air, after being passed through the walls of the bags in each compartment, is drawn, whereupon, it passes via a damper or butterfly-type device, as at 17, to a manifold pipe 16 which is connected to the suction side of a fan or a blower 20, from whence the clean air may be transmitted to the desired location.

The bags 22 are preferably made of a fabric material having a smooth, slippery finish, such as siliconized cloth, glass or Dacron. Preferably, in the form shown, the bags 22 are open at both ends and are connected at the tops thereof to an apertured top plate 7 and at the bottom ends to an apertured lower plate 8 which plates are connected to the frame 23 of the collector. The upper ends of the bags 22 may be attached by means of a sleeve 11 which is secured to the upper plate 7, such as by weldments or the like, and as by means of a locking clamp 24. The lower ends of the bags 22 may be similarly attached to another sleeve 14 which is secured to the bottom plate 8, such as by weldments or the like, and as by means of clamps 25. By this arrangement, the dust-laden air is transmitted downwardly through the bags 22 via the apertured plate 7 so that the clean air passes transversely through the material of the bags and with the trapped dust being collected on the interior surface of the bags ready for subsequent removal.

Now in accordance with the invention, a deflecting means 32 (FIG. 1) may be affixed to the bag 22. Magnetic means 38 are provided in spaced relation from the bag 22 and the deflecting means 32. Either the deflecting means or the magnetic means or both may be adapted to be periodically electrically energized to produce an electro-magnetic field whereby periodic attraction and/or repulsion of the deflecting means will occur, thereby causing the bag to be deflected and the dust collected thereon to be removed. The deflecting means may be periodically magnetizable or permanently magnetized; it is either attached to the bag or may be disposed in close proximity thereto.

Figure 2:
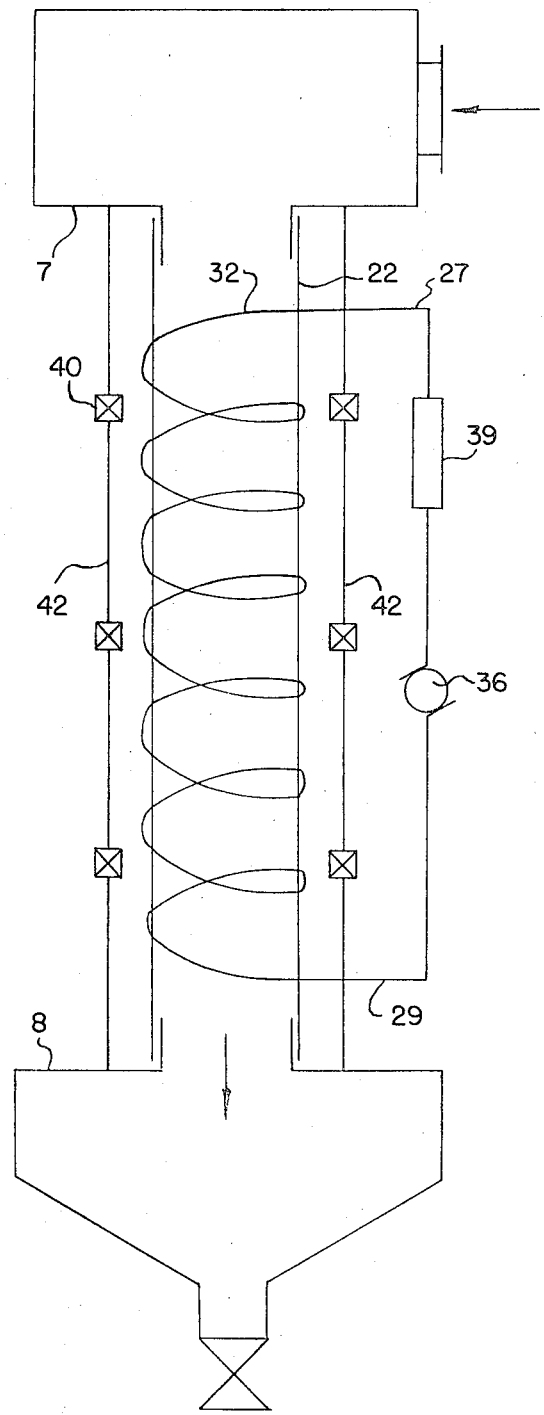
FIG. 2 is a diagrammatic representation showing one form of separator device made in accordance with the present invention.

In a preferred embodiment of the invention, shown in FIG. 2, the deflecting means 32 is magnetizable and is shown as an electrical conductor or wire preferably disposed in axially coiled relation about the periphery of the filter bag 22 to form an elongated electromagnet.

Wire 32 is physically affixed to the bag by any suitable means, such as by weaving the wire into the fabric of the bag, or having the wire taped or sewn to the bag in any suitable manner. It is preferred that the wire extend over a major portion of the bag length in order to maximize the deflection of the bag upon deflection of the deflecting means. Moreover, the wire should have sufficient slack to allow the desired deflection. Where the deflecting means is disposed adjacent the filter bag, the deflecting means should be sufficiently close to the bag that the deflecting means can physically deflect the bag.

Where the deflecting means is magnetizable, suitable support receptacles 34 and 35 (FIG. 1) may be positioned at the upper and lower end of the bag 22 to receive the lead ends 27 and 29 of the deflecting means, such as of wire 32, and support such in a predetermined position with respect to the bag surface. Preferably, the lead ends will be supported at a point along the bag at which the radial movement of the bag material is not substantially restricted, such as the portion of the bag between the innermost projecting portions of the sleeve members 11 and 14. The receptacles are adapted to provide for the electrical connection of the conductor 32 to a suitable source of electrical power in addition to providing a support for maintaining the lead ends of the wire 32 in a permanently fixed position with respect to the bag. When the wire 32 is disposed in coiled relation about the bag, it is preferred that the lead ends extend from the bag generally tangent to the bag. By this arrangement, the forces exerted on the wire upon energization will be in a generally axial direction along the wire, thereby minimizing the bending of the wire at the receptacle. The receptacles may be mounted on the frame 23 in any suitable manner, as known in the art. The receptacles act to receive the lead ends of the wire 32 and connect them to a suitable source of power associated with the receptacle, such as the D.C. generator 36. The generator 36 may be connected in series with a suitable timing device 39 (FIG. 2) which may be periodically actuated to cyclically energize and de-energize the wire 32.

In the embodiment of FIG. 2, the magnetic means 38 are in the form of permanent magnets 40 provided to magnetically interact with the deflecting means 32. Where the magnetic means 38 are in the form of permanent magnets, such as 40, the deflecting means 32 must be electrically energized and de-energized so as to alternately magnetize and de-magnetize the deflecting means so as to achieve deflecting movement of the deflecting means 32 with respect to the magnetic means 38. Preferably, the permanent magnets 40 are supported in superposed relation between the upper and lower plates 7 and 8 externally of and spaced apart from the bag 22. Any number of magnets may be used, but preferably more than one should be utilized so as to obtain a more uniform deflection over the entire length of the bag. The magnets may be suspended in any suitable manner, such as by metal cables or rods 42, in rows which extend vertically in chamber 12. The cables 42 may be affixed at the upper and lower ends in any conventional manner to the plates 7 and 9 so as to maintain them in a relatively stationary position. Any number of rows of magnets may be provided, but preferably four (4) rows of magnets spaced 90 degrees apart about the periphery of the bag should be furnished to achieve satisfactory uniformity of bag deflection.

Preferably, the axes of polarity of the permanent magnets 40 are disposed at right angles to the longitudinal central axis of the bag 22. The axes of polarity may be disposed at other angles relative to the longitudinal central axis of the bag 22, but the polarity relationship of the permanent magnets 40 and the wire 32 should be such that upon energization of the wire 32 the coil will be attracted or repelled by the permanent magnets. In this form, the permanent magnets 40 should be disposed sufficiently close to the wire 32 so that the wire 32 will be attached or repelled with respect to the magnets 40 upon periodic energization of the wire 32.

Figure 3:
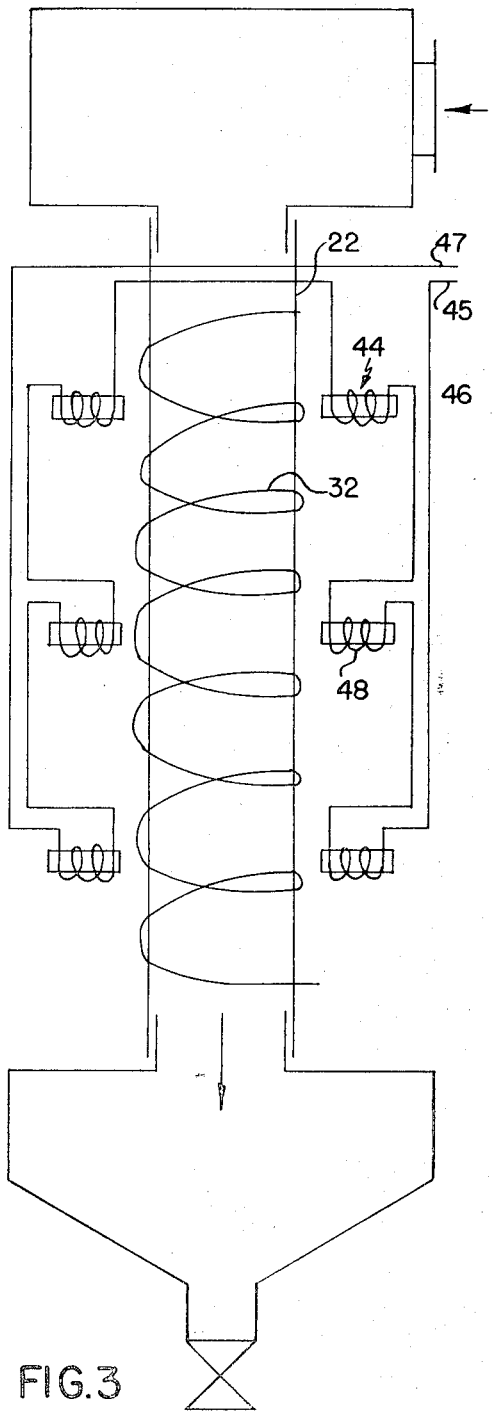
FIG. 3 is a diagrammatic representation showing a modification of a separator device made in accordance with the present invention.

In FIG. 3 there is diagrammatically illustrated a modification of the separator device which is somewhat similar to that shown in FIG. 2, except that a plurality of electromagnets 44 are employed in lieu of the permanent magnets 40 and which may be mounted in the manner of FIG. 2. In this form, the electromagnets 44 may each comprise an inner core 46, such as of iron or the like, about which is disposed an outer current carrying coil or conductor 48. As shown, the axes of polarity of the electromagnets 44 is disposed generally horizontally or at right angles with respect to the longitudinal central axis of the bag 22. The lead ends 45 and 47 of the conductor 48 may be connected to a suitable source of electrical power (not shown) for simultaneously and periodically energizing the respective electromagnets 44. The deflection means or wire 32, in this form, may also be electrically energized from a power source of the type shown in FIG. 2. The electromagnets 44 and the wire 32 may be energized from the source or separate circuits, as desired.

In the form shown in FIG. 3, the wire 32 need not be electrically energized as in the form of the device shown in FIG. 2, but only the electromagnets 44 need be energized or de-energized to achieve the desired deflective movement of the wire 32 and hence, the bag 22 for shaking deposited dust or the like therefrom.

In FIG. 4, there is diagrammatically illustrated another modification of the separator device which is generally similar to that shown in FIG. 3, except that the electromagnets 50 are disposed interiorly of the filter bag 22. In this form the conductor 51 is also disposed in axial coiled relationship about the core 52 interiorly of the bag. In this form, however, the axes of polarity of the electromagnets 50 are disposed generally parallel to the longitudinal central axis of the bag 22 or in a North N and South S direction, as shown.

In FIG. 5 there is diagrammatically illustrated a further modification of the separator device which is generally similar to that shown in FIG. 2, but wherein the permanent magnets 54 are of an elongated construction disposed axially interiorly of the filter bag 22 with their axes of polarity extending generally parallel to the longitudinal central axis of the bag and in a North N and South S direction, as aforesaid in connection with FIG. 4.

Figure 6:
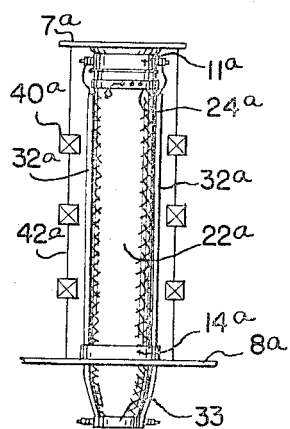
FIG. 6 is a front elevational view on a scale corresponding to that of FIG. 1 and showing another type filter member and a further modification of the deflecting means made in accordance with the invention.

In FIG. 6 there is illustrated another modification of the separator device wherein the deflection means, such as wires 32a and 32c, are disposed in lengthwise extending, generally parallel relationship with respect to the longitudinal central axis of the bag 22a rather than in the axially coiled relation described in connection with FIGS. 2 to 5. In this form, the magnetic means, such as permanent magnets 40a, are disposed exteriorly of the bag and in laterally spaced relation with respect thereto. As shown, the permanent magnets 40a may be mounted in axially spaced, generally vertically oriented relation on cables or rods 42a which may be attached at their opposed ends to the respective plates 7a and 8a. Here again, the wire 32a and 32c must be periodically electrically energized and de-energized to achieve deflective movement of the bag 22a for the purposes described in connection with FIG. 2.

In the modification shown in FIG. 6, the filter bag 22a is of a somewhat different construction compared to that described in connection with FIG. 1. As shown, the upper end of the bag may be secured in the manner previously mentioned, but instead of the bag being connected at its lower end to the sleeve 14a, the bag is made to extend through the sleeve 14 and below the lower plate 8a. A weighted ring member 33 may be disposed adjacent the lower end of the bag 22a. Because the bag is allowed to move freely within the sleeve 14a, the weight of the ring 33 will operate to maintain the bag in a straight generally taut condition. Moreover, the proper amount of slack is automatically present in this type of bag construction, to afford the desired deflective movement of the bag upon interaction between the magnetic means and deflection means, as aforesaid. Accordingly, it will be seen that various types and constructions of filter bags or the like may be employed in accordance with the principles of the invention.

From the foregoing description, it will be seen that the deflection means, such as wires 32, may be disposed interiorly, exteriorly and/or integrally with the respective filter bag. Moreover, the wire 32 could be in actual physical engagement with the material of the bag or spaced in close proximity to the confronting surface of the bag dependent upon the desired deflection characteristics to be imparted to the bag. Also, the wires 32 may be disposed in axially coiled or straight-line relationship with respect to the bag, as aforesaid.

In the foregoing modifications energy may be supplied to the magnetic means (permanent or electromagnetic) and/or to the deflection means (coiled or straight wire) from a suitable D.C. power source, such as the generator 36 shown in FIG. 2. When a D.C. power is employed, a suitable timer device 39 (FIG. 2), such as a mechanical or electro-mechanical timer, may be connected in circuit with the magnetic means (electromagnetic) and/or the deflection means so as to control the period of energization of the magnetic means and the deflection means either individually of one another or simultaneously with one another. In FIG. 2, for instance, when D.C. power is employed, it is necessary to energize and de-energize the wire 32. In such case, a suitable timer device, such as 39, may be provided to control the periodic time interval between such energization and de-energization and hence, to control the rate of deflective movement imparted to the filter bag.

It is to be understood that A.C. power may be employed in lieu of D.C. power. When A.C. power is used the deflection will occur at a rate determined by the frequency of the power source, whereas, a timing device, such as timer 39, may be utilized to control the period of energization.

I claim:

1. A filter device of the type for removing solids from a gaseous stream comprising:
    a filtering compartment including an inlet opening adapted to be connected to a gaseous stream of dirty air under pressure and an outlet opening adapted to discharge clean air therethrough from said filtering compartment,
    a porous, flexible filter member disposed within said filtering compartment adapted to collect solids thereon,
    said filtering compartment including a frame and said filter member is supported by said frame between said inlet and said outlet openings in the path of said gaseous stream,
    at least one flexible magnetic member is supported by said frame,
    at least one relatively stationary magnetic member supported by said frame in spaced relation from said flexible magnetic member,
    said flexible magnetic member being disposed adjacent to said filter member in sufficiently close proximity thereto to move the same upon simultaneous magnetization of said magnetic members,
    at least one of said magnetic members connected to a source of electrical energy adapted to be periodically magnetized thereby,
    a timing means operably connected in an electrical circuit with said source of electrical energy and with said at least one of said magnetic members connected to said source of electricity to cause said flexible magnetic member to move with respect to said stationary magnetic member for dislodging solids collected on said filter member upon movement of said flexible magnetic member resulting in movement of said filter member, and
    said flexible magnetic member being in contact with said filter member upon the said movement of said filter member.

2. A filter device in accordance with claim 1, wherein said filter member comprises a fabric-type member.

3. A filter device in accordance with claim 1, wherein said filter member comprises an elongated, tube-like member.

4. A filter device in accordance with claim 3, wherein said flexible magnetic member is disposed interiorly of said tube-like member.

5. A filter device in accordance with claim 3, wherein said flexible magnetic member comprises an electrical conductive element disposed adjacent to said tube-like member, and
said electrically conductive element is disposed in axially coiled relation about the periphery of said tube-like member.

6. A filter device in accordance with claim 5, wherein said electrically conductive element comprises a permanently magnetized material.

7. A filter device in accordance with claim 5, wherein said electrically conductive element comprises a material which may be periodically magnetized.

8. A filter device in accordance with claim 1, wherein said flexible magnetic member comprises an electrically conductive element disposed adjacent said filter member.

9. A filter device in accordance with claim 1, wherein said stationary magnetic member comprises a permanent magnet spaced from said flexible magnetic member.

10. A filter device in accordance with claim 1, wherein said stationary magnetic member comprises an electromagnet spaced from said flexible magnetic member.

11. A filter device in accordance with claim 1, wherein said timing means is operably connected and arranged to periodically apply electrical energy from said source of electrical energy to said flexible magnetic member for periodical magnetization thereof.

12. A filter device in accordance with claim 1, wherein said timing means is operably connected and arranged to periodically apply electrical energy from said source of electrical energy to said stationary magnetic member for periodical magnetization thereof.

13. A filter device in accordance with claim 1, wherein said flexible magnetic member is attached to said filter member.

14. A filter device of the type for removing solids from a gaseous stream comprising:
    a filtering compartment including an inlet opening adapted to be connected to a gaseous stream of dirty air under pressure and an outlet opening adapted to discharge clean air therethrough from said filtering compartment, a porous, flexible filter member disposed within said filtering compartment adapted to collect solids thereon, said filtering compartment including a frame and said filter member is supported by said frame between said inlet and said outlet openings in the path of said gaseous stream, said filter member comprising an elongated, tube-like structure, at least one elongated flexible magnetic member is supported by said frame in axially coiled relation with respect to the lengthwise axis of said filter member, a plurality of relatively stationary magnetic members are supported by the frame in spaced relation from said flexible magnetic member, said flexible magnetic member being disposed adjacent to said filter member in sufficiently close proximity thereto to move the same upon simultaneous magnetization of said magnetic members, at least one of said magnetic members connected to a source of electrical energy adapted to be periodically magnetized thereby, a timing means operably connected in an electrical circuit with said source of electrical energy and with said at least one of said magnetic members connected to said source of electricity to cause said flexible magnetic member to move with respect to said stationary magnetic member for dislodging solids collected on said filter member upon movement of said flexible magnetic member resulting in movement of said filter member, and said flexible magnetic member is in contact with said filter member upon the said movement of said filter member.

References Cited

UNITED STATES PATENTS

| | | | |
|---|---|---|---|
| 573,837 | 12/1896 | Whitmore | 55—299 |
| 1,190,221 | 7/1916 | Daugherty | 55—381 X |
| 1,757,834 | 5/1930 | Haegler | 55—334 X |
| 1,981,266 | 11/1934 | Green | 324—97 |
| 2,653,444 | 9/1953 | Oishei | 55—296 X |
| 2,932,054 | 4/1960 | Lichtgarn | 15—363 |
| 3,310,175 | 3/1967 | McLagan | 210—193 |
| 3,377,781 | 4/1968 | Hammond | 55—304 X |
| 1,512,776 | 10/1924 | Lough | 55—300 |
| 1,538,985 | 5/1925 | Greene | 55—300 |
| 3,326,383 | 6/1967 | Pranovi | 55—300 X |

FOREIGN PATENTS

| | | |
|---|---|---|
| 931,253 | 10/1947 | France. |
| 157,349 | 12/1904 | Germany. |
| 880,535 | 6/1953 | Germany. |
| 281,048 | 12/1927 | Great Britain. |
| 566,467 | 9/1957 | Italy. |
| 106,208 | 12/1942 | Sweden. |
| 63,725 | 7/1945 | Denmark. |
| 256,418 | 2/1913 | Germany. |
| 614,540 | 12/1948 | Great Britain. |
| 1,274,656 | 9/1962 | France. |

DENNIS E. TALBERT, Jr., Primary Examiner

U.S. Cl. X.R.

55—283, 299, 300, 304, 341, 378; 209—379; 210—332, 407; 310—10; 317—123